Patented Aug. 19, 1947

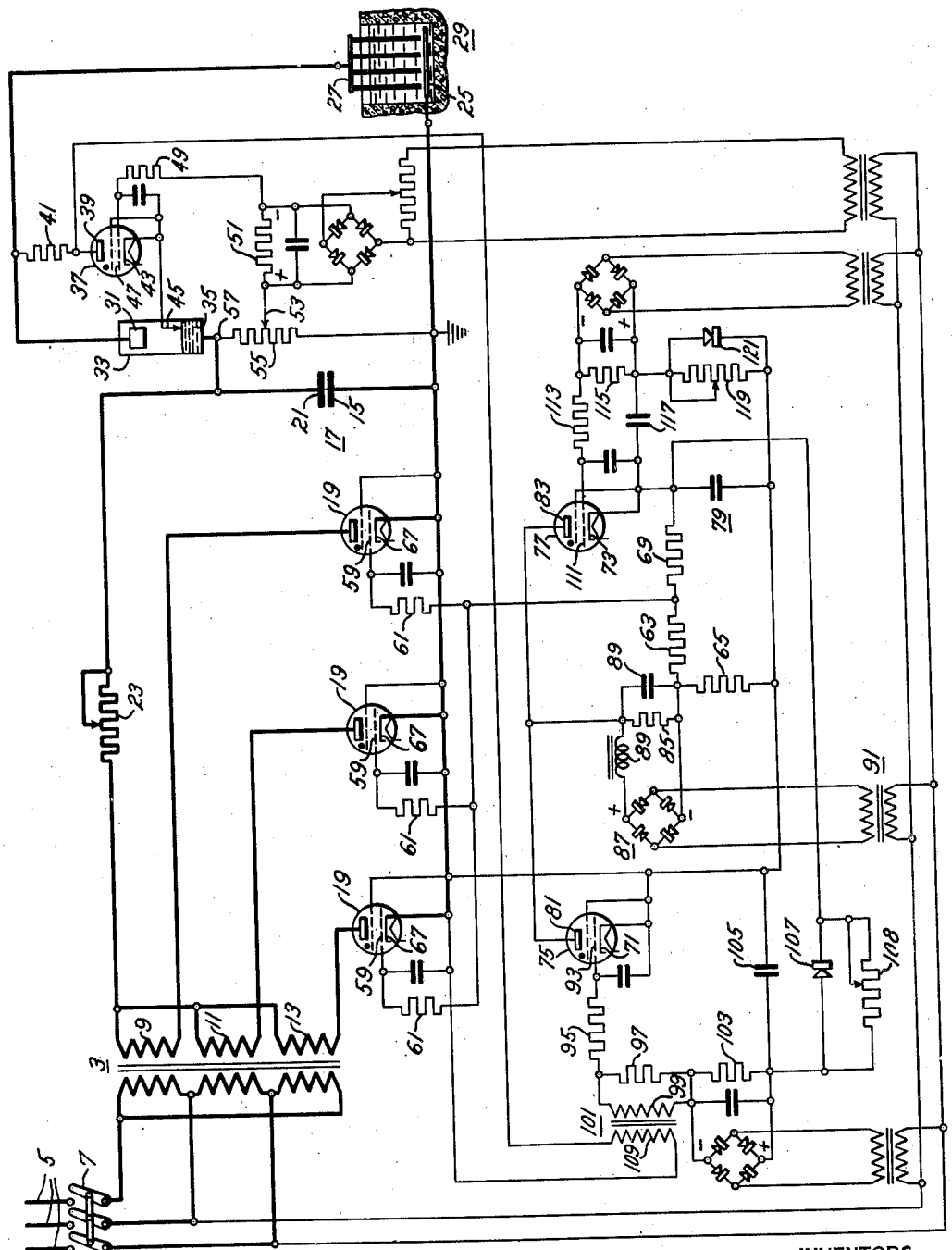

2,426,037

UNITED STATES PATENT OFFICE 2,426,037

ELECTRONIC CONTROL DEVICE FOR FORMING IMPULSES

John R. Mahoney, Oak Ridge, Tenn., and Harry J. Bichsel, Pittsburgh, Pa., assignors to Westinghouse Electric Corporation, East Pittsburgh, Pa., a corporation of Pennsylvania Application July 14, 1945, Serial No. 605,060

14 Claims. (Cl. 315—246)

1

This invention relates to an electronic control device and has particular relation to such a device for use in an electric fish barrier.

In accordance with the teachings of the prior art, electric barriers for fish have been provided in the past which include two or more electrodes immersed in a waterway and apparatus for supplying energy to the electrodes to provide an electrified zone therebetween effective to repel fish. Energy is usually supplied to the electrodes in the form of periodic, spaced, current impulses. The frequency of the impulses and the duration of each impulse is such as to prevent passage of fish between the electrodes without injuring them.

It is an object of our invention to provide new and improved apparatus for supplying periodic current impulses through a load.

Another object of our invention is to provide a novel apparatus for supplying periodic current impulses through a pair of electrodes adapted to be immersed in a waterway as part of an electric fish barrier.

A further object of our invention is to provide novel apparatus for supplying spaced current impulses through a load, which apparatus is reliable in operation and requires a minimum amount of servicing.

In accordance with our invention charging means are provided to supply unidirectional current through a capacitor to charge it. An electric discharge valve of the arc-like type is adapted to be connected in circuit with the barrier electrodes across the capacitor to form a discharge circuit therefor. Control means for the valve are arranged to be operable a preselected time interval after initiation of charging of the capacitor to render the valve conductive. Blocking means are also provided which are responsive to the initiation of a discharge of the capacitor through the barrier electrodes for rendering the charging means ineffective for another predetermined time interval of a length sufficient to permit the valve to become non-conductive therein. Consequently, there is a repeated charging and discharging of the capacitor to supply the desired spaced current impulses through the electrodes. The blocking means also includes an arrangement whereby a resetting of the apparatus is made automatically when certain temporary uncontrollable conditions result in a failure of the apparatus to supply a pulse of current.

The features of our invention which we consider novel are set forth more particularly in the accompanying claims. The invention itself, however, with respect to the details thereof together with additional objects and advantages may be better understood from the following description of a specific embodiment of our invention as illustrated in the circuit diagram forming the single figure of the accompanying drawing.

In the embodiment shown in the drawing, a three-phase supply transformer 3 is to be energized from a three-phase supply system 5 through a main switch or circuit breaker 7. The secondary windings 9, 11, 13 of the transformer 3 are arranged in a Y connection with each phase terminal connected to one plate 15 of a main capacitor 17 through individual electric discharge valves 19, preferably of the arc-like type, such as thyratrons hereinafter referred to as rectifier valves. The other plate 21 of the main capacitor 17 is connected to the return line for the secondary windings 9, 11, and 13 through a variable resistor 23. It is then apparent that while the rectifier valves 19 are in condition to conduct, they become conductive in succession with each valve becoming conductive as its associated phase voltage becomes more positive than the other phase voltages and unidirectional charging current is supplied through the main capacitor 17 to charge it with one plate 15 positive and the other plate 21 negative.

The positive plate 15 of the main capacitor 17 is adapted to be connected to one of a pair of electrodes 25 and 27 immersed in a waterway 29. The other electrode 27 is connected to the anode 31 of an electric discharge valve 33 of the arc-like type, preferably an ignitron, the cathode 35 of which is connected to the negative plate 21 of the main capacitor 17. Another electric discharge device 37 of the arc-like type, preferably a thyratron, which is hereinafter designated as a firing tube, is provided to control ignition of the ignitron 33. The anode 39 of the firing tube 37 is connected through a resistor 41 to the anode 31 of the ignitron 33 while the cathode 43 is connected to the control electrode 45 of the ignitron 33.

The control circuit of the firing tube 37 may be traced from the control grid 47 thereof through a grid resistor 49, a source 51 of direct current biasing voltage to an intermediate tap 53 on a voltage divider 55 across the capacitor 17, and from the negative terminal 57 of the voltage divider 55 through the cathode 35 and control electrode 45 of the ignitron 33 to the cathode 43 of the firing tube 37. The magnitude of the biasing voltage of source 51 is adjustable and is preselected so that the firing tube 37 is rendered conductive when the voltage across the divider 55, and therefore across the main capacitor 17, reaches a predetermined value.

When the firing tube 37 becomes conductive, current immediately starts to flow from the charged capacitor 17 through the electrodes 25 and 27, the resistor 41, the firing tube 37 and the control electrode 45 and cathode 35 of the ignitron 33. Such current is less than that required to provide the desired electrified zone in the waterway but is sufficient to render the ignitron 33 conductive almost immediately. When the ignitron 33 becomes conductive, the firing tube 37 and resistor 41 are effectively short circuited causing the firing tube to become non-conductive and the capacitor 17 is quickly discharged through the electrodes 25 and 27 and the ignitron 33 to provide the desired current impulse.

As previously indicated, the rectifier valves 19 are normally conductive to supply charging current through the main capacitor 17. If these rectifier valves 19 were permitted to continue to conduct after the ignitron 33 is rendered conductive, current would flow directly from the supply transformer 3 through the rectifier valves 19, the electrodes 25 and 27 and the ignitron 33 so that the latter would continue to conduct even after the main capacitor 17 is discharged. It is therefore necessary to provide blocking means to render the rectifier valves 19 non-conductive during the discharge period of the main capacitor 17.

The control circuit of the rectifier valves 19 may be traced from the control grids 59 of the valves through corresponding grid resistors 61 and a pair of resistors 63 and 65 to the cathodes 67 of the rectifier valves. As will be explained later, the pair of resistors 63 and 65 in the control circuit normally have a voltage thereacross tending to make the control grids 59 of the rectifier valves 19 positive with respect to their cathodes 67 so that the rectifier valves 19 are normally conductive.

The two resistors 63 and 65 in the control circuit of the rectifier valves 19 are connected in series with a third resistor 69 between the cathodes 71 and 73 of a pair of auxiliary valves 75 and 77 of the arc-like type, preferably thyratrons. A first control capacitor 79 is connected in parallel with the three resistors 63, 65 and 69 between the cathodes 71 and 73 of the auxiliary valves 75 and 77. The anodes 81 and 83 of the auxiliary valves 75 and 77 are connected together and through another resistor 85 to the junction point between the two resistors 63 and 65 in the control circuit of the rectifier valves 19. A direct current voltage appears across this resistor 85 which is supplied through a full-wave rectifier 87 and filtering elements 89 energized from an auxiliary transformer 91 connected to the supply lines.

The control circuit of the first auxiliary valve 75 may be traced from the control grid 93 thereof through a grid resistor 95, another resistor 97 connected across the secondary winding 99 of an impulse transformer 101, a source 103 of direct current biasing voltage and a second control capacitor 105 to the cathode 71. The junction point between the biasing voltage source 103 and the capacitor 105 is connected through a dry rectifier 107 to the cathode 73 of the second auxiliary valve 77. The dry rectifier 107 is arranged to present a low impedance to current flowing away from the junction point and a high impedance to current flowing in the opposite direction and a potentiometer 108 is connected in shunt therewith.

The primary winding 109 of the impulse transformer 101 is connected between the anode 39 of the firing tube 37 and the electrode 25 connected to the positive plate 15 of the main capacitor 17. Consequently, when the firing tube 37 is rendered conductive, a voltage impulse is impressed in the control circuit of the first auxiliary valve 75 which is sufficient to overcome the biasing voltage of source 103 and render that valve conductive.

The control circuit of the second auxiliary valve 77 may be traced from the control grid 111 through a grid resistor 113, a source 115 of biasing voltage and a third control capacitor 117 to the cathode 73. The junction point between the third control capacitor 117 and the source 115 of biasing voltage is connected to the cathode 71 of the first auxiliary valve 75 through a potentiometer 119 which is shunted by another dry rectifier 121. This dry rectifier 121 offers low impedance to a flow of current from the junction point toward the cathode 71 and a high impedance to a flow of current in the opposite direction.

Prior to closure of the main switch or circuit breaker 7, all of the valves 19, 33, 37, 75 and 77 are non-conductive. Current is then supplied to heat the filaments of the various valves by the usual means which are omitted from the drawing for purposes of clarity. After the filaments are heated, the circuit breaker 7 is to be closed and the supply transformer 3 energized. At this instant of first placing the apparatus into operation, neither of the auxiliary valves 75 and 77 is conductive. However, once the apparatus is in full operation, one or the other of the auxiliary valves 75 and 77 is always conductive.

When the supply transformer 3 is first energized, the control grids 59 of the rectifier valves 19 are at substantially the same potential. Consequently, current flows from the supply transformer 3 through the rectifier valves 19 and the main capacitor 17 to charge the main capacitor 17 at a rate preselected by the setting of the variable resistor 23. When the voltage across the main capacitor 17 reaches the preselected value, the firing tube 37 is rendered conductive to render the ignitron 33 conductive. The main capacitor 17 then discharges through the electrodes 25 and 27 and the ignitron 33. A voltage impulse is thereupon supplied to the control circuit of the first auxiliary valve 75 through the impulse transformer 101 to render that valve conductive.

When the first auxiliary valve 75 becomes conductive, current flows from the resistor 85 acting as a direct current voltage source, through the anode 81 and cathode 71 of the auxiliary valve 75 and the resistor 65 to the source 85. The voltage developed across the resistor 65 by the flow of current therethrough causes the grids 59 of the rectifier valves 19 to become sufficiently negative with respect to their cathodes 67 to prevent the rectifier valves from becoming conductive in their turns. As a result, the supply of charging current to the main capacitor 17 is interrupted and the ignitron 33 becomes non-conductive when the main capacitor 17 is substantially discharged.

While the first auxiliary valve 75 is conductive, current through the valve also flows through the second control capacitor 105 and the first dry rectifier 107 and the resistors 69 and 63 to the source 85, thus charging the second control capacitor. The first control capacitor 79 is also charged at this time by the voltage appearing across the resistor 65 in circuit with the first auxiliary valve 75. This charge is such that the plate of the capacitor 79 connected to the cathode 71 of the first auxiliary valve 75 is positive, and the other plate is negative.

The voltage appearing across the resistor 65 in circuit with the first auxiliary valve 75 also charges the third control capacitor 117 through the potentiometer 119 and the resistors 69 and 63. The rate of charge is determined by the setting of the potentiometer 119. The polarity of the charge thus developed on the third control capacitor 117 tends to oppose the biasing voltage from source 115 in the control circuit of the second auxiliary valve 77. Consequently, after a preselected time interval determined by the setting of the potentiometer 119, the charge on the third control capacitor 117 causes the second auxiliary valve 77 to be rendered conductive.

When the second auxiliary valve 77 becomes conductive, the voltage across the first control capacitor 79 less the arc drop of the second auxiliary valve 77 is suddenly impressed between the anode 81 and cathode 71 of the first auxiliary valve 75 and is of such polarity and magnitude as to render that valve non-conductive. With the first auxiliary valve 75 non-conductive, and the second auxiliary valve 77 conductive, current flows from the source 85 through the second auxiliary valve 77 and the resistors 69 and 63 back to the source. The voltage developed across the resistor 63 by this current causes the grids 59 of the rectifier valves 19 to become positive with respect to their cathodes 67 and those valves again become conductive to supply charging current through the main capacitor 17.

While the second auxiliary valve 77 is conductive, the first control capacitor 79 is discharged through resistor 65, source 85 and valve 77 and then charged with a polarity opposite to that received while the first auxiliary valve 75 was conductive. The third control capacitor 117 is discharged through rectifier 121, resistor 65 and source 85, second auxiliary valve 77 and is then charged to the opposite polarity by current through the valve 77. The second control capacitor 105 is discharged through the resistor 65, source 85, valve 77 and potentiometer 108 and is then recharged by current from the source through the valve. The setting of potentiometer 108 in this charging circuit for the second control capacitor 105 is such that the capacitor 105 does not attain a charge of sufficient magnitude to overcome the biasing voltage of source 103 and render the first auxiliary valve 75 conductive in the time required to charge the main capacitor 17 to the preselected value. Consequently, the charge on the second control capacitor 105 ordinarily does not effect the first auxiliary valve 75.

When the main capacitor 17 is again charged to the preselected value of voltage, the ignitron 33 is rendered conductive to discharge the main capacitor 17 through the electrodes 25 and 27 in the waterway. The resulting impulse through transformer 101 causes the first auxiliary valve 75 to be rendered conductive and the charge on the first control capacitor 79 is effective to cause the second auxiliary valve 77 to become non-conductive. When the first auxiliary valve 75 becomes conductive and the second auxiliary valve 77 becomes non-conductive, the grids 59 of rectifier valves 19 become negative with respect to their cathodes 67 to block the flow of current from the supply transformer 3. While this condition exists the main capacitor 17 is discharged and ignitron 33 becomes non-conductive, and the first, second and third control capacitors 79, 105, 117 are discharged and recharged in the opposite direction. After a time interval determined by the setting of the potentiometer 119, the second auxiliary valve 77 again becomes conductive to initiate recharging of the main capacitor 17.

In some applications it is desirable to supply the current impulses nearly twenty-four hours a day and it has been found that every once in a while the ignitron 33, for some reason or other, fails to become conductive when the firing tube 37 becomes conductive. Consequently, the firing tube 37 continues to conduct and the main capacitor discharges through it. Because of the resistor 41, the rate of discharge is considerably slower than through the ignitron 33. Now if the timing of the system is such that a relatively long time is available for discharging the main capacitor 17, a failure of the ignitron to become conductive merely causes the capacitor 17 to discharge slowly through the firing tube 37 which becomes non-conductive after the discharge and before recharging is initiated. Then the ignitron 33 ordinarily becomes conductive in the usual manner the next time the firing tube 37 becomes conductive.

It is sometimes desirable to have a current pulse supplied through the electrodes as often as eight times a second. The main capacitor 17 must then be charged and discharged in one-eighth of a second. Under such high speed conditions, there is insufficient time for the main capacitor to discharge completely through the firing tube 37 in the event the ignitron 33 fails to become conductive before the supply of charging current is reestablished. Consequently, the firing tube 37 is still conductive when the rectifier valves 19 again become conductive to supply current to the main capacitor 17. But the main capacitor 17 is not recharged as it is shunted by the then conductive firing tube 37. If the main capacitor 17 is not recharged, there is no impulse delivered through transformer 101 to cause a blocking of the flow of current through rectifier valves 19. Without a blocking of current through the rectifier valves 19, control of the system would be lost and no further current impulses would be supplied.

It is also to be noted that a similar situation may be brought about if the ignitron 33 becomes conductive in the usual manner but the time for discharge is so short that the ignitron occasionally does not become completely deionized before the supply of charging current is reestablished. Then the ignitron continues to conduct and no further current impulses would be supplied.

The flow of current through the rectifier valves 19 may be blocked when either the firing tube or the ignitron continues to conduct current as described, to reset the system for normal operation by opening and reclosing the circuit breaker. However, it is usually impractical to have an operator in attendance to reset and restart the system upon these rare occasions of failure. In the system shown in the drawing resetting and restarting is afforded through the second control capacitor 105.

If the firing tube 37 or ignitron 33 should continue to conduct during the charging period, there will not be any pulse through transformer 101 to render the first auxiliary valve 75 conductive. The second control capacitor 105 continues to be charged, however, through the second auxiliary valve 77 which is then conductive. Consequently, a predetermined time interval after initiation of the charging current for the main capacitor 17 as determined by potentiometer 108, which interval is greater than the time interval ordinarily required to charge the main capacitor 17 to the preselected voltage, the second control capacitor 105 is charged to a voltage sufficient to overcome the biasing voltage of source 103 in the control circuit of the first auxiliary valve 75 to render that valve conductive. When the first auxiliary valve 75 then becomes conductive, current flow through the rectifier valves 19 is blocked, as previously described, for the predetermined time interval selected by adjustment of the potentiometer 119. During this interval, there is sufficient time for the nearly discharged main capacitor 17 to completely discharge and for the conductive firing tube 37 or ignitron 33, as the case may be, to become non-conductive. At the end of the time interval the second auxiliary valve 77 again becomes conductive to initiate recharging of the main capacitor 17, and a new cycle of operation is begun.

It is thus apparent that if an impulse is not delivered through transformer 101, the first and second auxiliary valves 75 and 77 with the first, second and third control capacitors 79, 105 and 117 and associated circuits function as a square wave voltage generator with the duration of each voltage pulse being individually determined. Then the third control capacitor 117 and the potentiometer 119 function to time the period of conductivity of the first auxiliary valve 75 and the second control capacitor 105 and potentiometer 108 function to time the period of conductivity of the second auxiliary valve 77. The rectifier 107 permits the second control capacitor 105 to be rapidly discharged and recharged in the opposite direction to a predetermined voltage during the period of conductivity of the first auxiliary valve 75 so that the subsequent discharging and charging through potentiometer 108 begins each time from the same voltage to insure accurate timing even though the period of conductivity of valve 75 is different from that of valve 77 because of a difference in settings of potentiometers 108 and 119. Rectifier 121 serves a similar function with respect to the third control capacitor 117.

It is also to be noted that in some cases either of the potentiometers 108 and 119 across the dry rectifiers 107 and 121, respectively may be omitted. If potentiometer 108 is omitted, then the third control capacitor 117 is charged in the usual way through potentiometer 119 while the first auxiliary valve 75 is conductive but the second control capacitor is charged through the back or high resistance of the dry rectifier 107 which is, of course, an asymetric conductor, while said second auxiliary valve 77 is conductive.

Although we have shown and described a preferred embodiment of our invention, we are aware that many modifications thereof may be made without departing from the spirit of the invention. We do not intend therefore to limit our invention to the specific embodiment described and illustrated.

We claim as our invention:

1. In combination, a pair of discharge valves of the arc-like type, each having a pair of principal electrodes with one principal electrode of the first of said valves connected to the corresponding one principal electrode of the second valve, an impedance element connected between the other principal electrodes of said first and second valve, means adapted to function as a source of direct current connected from the junction between said one principal electrodes to an intermediate point on said impedance element, said valves being adapted to be conductive alternately, a capacitor connected in parallel with said impedance element whereby it is charged to opposite polarities alternately with alternate conductivity of said first and second valves, the charge on said capacitor being effective to render non-conductive whichever valve is conductive upon the other valve being rendered conductive, first timing means for rendering said first valve conductive a first preselected time after said second valve becomes conductive, and second timing means for rendering said second valve conductive a second preselected time after said first valve becomes conductive.

2. In combination, a pair of discharge valves of the arc-like type, each having a pair of principal electrodes with one principal electrode of the first of said valves connected to the corresponding one principal electrode of the second valve, an impedance element connected between the other principal electrodes of said first and second valves, means adapted to function as a source of direct current connected from the junction between said one principal electrodes to an intermediate point on said impedance element, said valves being adapted to be conductive alternately, a capacitor connected in parallel with said impedance element whereby it is charged to opposite polarities alternately with alternate conductivity of said first and second valves, the charge on said capacitor being effective to render non-conductive whichever valve is conductive upon the other valve being rendered conductive, first timing means responsive to current through said second valve for rendering said first valve conductive a first preselected time after said second valve becomes conductive, and second timing means responsive to current through said first valve for rendering said second valve conductive a second preselected time after said first valve becomes conductive.

3. In combination, a pair of discharge valves of the arc-like type, each having a pair of principal electrodes with one principal electrode of the first of said valves connected to the corresponding one principal electrode of the second valve, an impedance element connected between the other principal electrodes of said first and second valves, means adapted to function as a source of direct current connected from the junction between said one principal electrodes to an intermediate point on said impedance element, said valves being adapted to be conductive alternately, a first capacitor connected in parallel with said impedance element whereby it is charged to opposite polarities alternately with alternate conductivity of said first and second valves, the charge on said capacitor being effective to render non-conductive whichever valve is conductive upon the other valve being rendered conductive, a second capacitor connected in circuit with a first asymmetric conductor across said impedance element to be charged through the high resistance of said first asymmetric conductor by current through said first valve, means responsive to a preselected voltage on said second capacitor while said first valve is conductive for rendering said second valve conductive, a third capacitor connected in circuit with a second asymmetric conductor across said impedance element to be charged through the high resistance of said second asymmetric conductor by current through said second valve, and means responsive to a preselected voltage on said third capacitor while said second valve is conductive for rendering said first valve conductive.

4. Apparatus according to claim 3 which includes a first resistor in parallel with said first asymmetric conductor and a second resistor in parallel with said second asymmetric conductor, each of said first and second resistors offering a predetermined resistance less than the high resistance of the associated one of said asymmetric conductor to charging the second and third capacitors, respectively, by current through said first and second auxiliary valves, respectively.

5. Apparatus according to claim 3 which includes a first variable resistor in parallel with said first asymmetric conductor and adjustable to select the rate of charge of said second capacitor while said first valve is conductive, and a second variable resistor in parallel with said second asymmetric conductor and adjustable to select the rate of charge of said third capacitor while said second valve is conductive.

6. For use in supplying spaced current impulses to a load, the combination comprising a main capacitor, charging means for supplying charging current to said main capacitor, a main discharge valve of the arc-like type adapted to be connected in circuit with said load across said main capacitor to form a discharge circuit therefor, control means operable in response to a predetermined voltage on said main capacitor for rendering said main valve conductive, a square wave voltage generator comprising a pair of auxiliary discharge valves of the arc-like type arranged to be conductive alternately to provide an output voltage of one polarity while the first auxiliary valve is conductive and of opposite polarity while the second auxiliary valve is conductive, said charging means being connected to said generator and responsive to the output voltage thereof to be effective to supply charging current with an output voltage of said opposite polarity and ineffective with an output voltage of said one polarity, and means connected to said auxiliary valves effective to render non-conductive whichever auxiliary valve is conductive upon the other auxiliary valve being rendered conductive, starting means responsive to operation of said control means to render said first auxiliary valve conductive, first timing means for rendering said second auxiliary valve conductive a preselected time after said first auxiliary valve becomes conductive, and second timing means effective to render said first auxiliary valve conductive at the expiration of a predetermined time interval after said second auxiliary valve is rendered conductive if said first auxiliary valve is not rendered conductive by said starting means during said interval.

7. For use in supplying spaced current impulses to a low impedance load, the combination comprising a capacitor, charging means connected across said capacitor to supply charging current thereto, an electric discharge valve having an anode, a cathode of the pool type and an ignition electrode in contact with the cathode, said anode and cathode being adapted to be connected in circuit with said load across said capacitor to form a discharge circuit therefor, an impedance element, a discharge device of the arc-like type connected in a series circuit with said impedance element between said anode and ignition electrode, means for rendering said device conductive when said capacitor is charged to cause said valve to become conductive, blocking means for rendering said charging means ineffective for a predetermined interval of time, and means responsive to the voltage appearing across said load and impedance element when said device first becomes conductive for initiating operation of said blocking means.

8. For use in supplying spaced current impulses to a low impedance load, the combination comprising a capacitor, charging means connected across said capacitor to supply charging current thereto, an electric discharge valve having an anode, a cathode of the pool type and an ignition electrode in contact with the cathode, said anode and cathode being adapted to be connected in circuit with said load across said capacitor to form a discharge circuit therefor, an impedance element, a discharge device of the arc-like type connected in a series circuit with said impedance element between said anode and ignition electrode, means for rendering said device conductive when the capacitor is charged to cause said valve to become conductive, blocking means operable to render said charging means ineffective for a predetermined interval of time, and an impulse transformer having a primary winding connected across said load and impedance element and a secondary winding connected to said blocking means to deliver a voltage impulse to said blocking means to initiate operation thereof when said device becomes conductive.

9. For use in supplying spaced current impulses to a load, the combination comprising a capacitor, charging means connected across said capacitor to supply charging current thereto, an electric discharge valve of the arc-like type adapted to be connected in circuit with said load across said capacitor to form a discharge circuit therefor, control means operable in response to a preselected voltage across said capacitor for rendering said valve conductive, blocking means operable in response to operation of said control means to render said charging means inoperable for a first preselected time interval, and timing means effective at the expiration of a second predetermined time interval after re-initiation of operation of said charging means, greater than that normally required to charge said capacitor to said preselected voltage, to initiate operation of said blocking means in the event operation thereof is not initiated during said second interval.

10. For use in supplying spaced current impulses to a low impedance load, the combination comprising a capacitor, charging means connected across said capacitor to supply charging current thereto, an electric discharge valve having an anode, a cathode of the pool type and an ignition electrode in contact with the cathode, said anode and cathode being adapted to be connected in circuit with said load across said capacitor to form a discharge circuit therefor, an impedance element, a discharge device of the arc-like type connected in a series circuit with said impedance element between said anode and ignition electrode, means responsive to a predetermined voltage on said capacitor to render said device conductive to cause said valve to become conductive, blocking means for rendering said charging means inoperable for a first predetermined interval of time, means responsive to the voltage appearing across said load and impedance element when said device first becomes conductive for initiating operation of said blocking means, and timing means effective at the expiration of a second predetermined time interval after re-initiation of operation of said charging means, which second interval is greater than that normally required to charge said capacitor to said predetermined voltage, to initiate operation of said blocking means in the event operation thereof is not initiated during said second interval.

11. For use in supplying spaced current impulses to a load, the combination comprising a capacitor, charging means connected across said capacitor to supply charging current thereto, an electric discharge valve having an anode, a cathode of the pool type and an ignition electrode in contact with the cathode, said anode and cathode being adapted to be connected in circuit with said load across said capacitor to form a discharge circuit therefor, a discharge device of the arc-like type connected in a series circuit between said anode and ignition electrode, control means responsive to a predetermined voltage on said capacitor to render said device conductive to cause said valve to become conductive, blocking means for rendering said charging means inoperable for a first predetermined interval of time, means responsive to the operation of said control means for initiating operation of said blocking means, and timing means effective at the expiration of a second predetermined time interval after re-initiation of operation of said charging means, which second interval is greater than that normally required to charge said capacitor to said predetermined voltage, to initiate operation of said blocking means in the event operation thereof is not initiated during said second interval.

12. For use in supplying spaced current impulses to a load, the combination comprising a capacitor, charging means connected across said capacitor to supply charging current thereto, an electric discharge valve of the arc-like type adapted to be connected in circuit with said load across said capacitor to form a discharge circuit therefor, control means operable in response to a preselected voltage across said capacitor for rendering said valve conductive, and a square wave voltage generator arranged to produce an output voltage of alternating polarity, said charging means being responsive to said output voltage to be effective to supply charging current with an output voltage of one polarity and ineffective with an output voltage of the opposite polarity, said generator including means responsive to operation of said control means for initiating a first interval in which the output voltage is of said opposite polarity, first timing means operable a predetermined time after initiation of a first interval to initiate a second interval in which the output voltage is of said one polarity and second timing means operable a predetermined time after initiation of a second interval for initiating another first interval in the event said control means is not previously reoperated.

13. Apparatus for use with a source of unipolarity voltage comprising a pair of electric valves of the arc-like type connected in parallel circuit relation with each other across said source, an output impedance element for each valve in series therewith across said source, means effective to render a conductive one of said valves non-conductive upon the other valve becoming conductive, impulse means operable to render the first of said valves conductive at spaced instants, first timing means for rendering the second valve conductive a first predetermined time interval after the first valve becomes conductive, and second timing means for rendering the first valve conductive a second predetermined time interval after the second valve becomes conductive in the event said first valve has not been rendered conductive by said signal means during said second interval.

14. Apparatus for use with a source of unipolarity voltage comprising a pair of electric valves of the arc-like type, each having a pair of principal electrodes with one principal electrode of the first valve connected to the corresponding one principal electrode of the second valve, an impedance element connected between the other principal electrodes of the first and second valves, means connecting said source from the junction between said one principal electrodes to an intermediate point on said impedance element, said valves being adapted to be conductive alternately, a first capacitor in parallel with said impedance element and effective to render non-conductive whichever valve is conductive upon the other valve becoming conductive, impulse means operable to render the first valve conductive at spaced instants, a second capacitor connected in circuit with a first asymmetric conductor across said impedance element with the first asymmetric conductor offering its higher resistance to current through said first valve, a first resistor connected in shunt across said first asymmetric conductor, means responsive to a predetermined voltage on said first capacitor while said first valve is conductive for rendering the second valve conductive, a second capacitor connected in circuit with a second asymmetric conductor across said impedance element with the second asymmetric conductor offering its higher resistance to current through said second valve, a second resistor connected in shunt across said second asymmetric conductor, and means responsive to a predetermined voltage on said second capacitor while the second valve is conductive for rendering said first valve conductive.

JOHN R. MAHONEY.
HARRY J. BICHSEL.

REFERENCES CITED

The following references are of record in the file of this patent:

UNITED STATES PATENTS

| Number | Name | Date |
|---|---|---|
| 2,059,562 | Curtis | Nov. 3, 1936 |
| 2,233,045 | Bonner | Feb. 25, 1941 |
| 2,310,092 | Knowles | Feb. 2, 1943 |
| 2,370,727 | Holden | Mar. 6, 1945 |